United States Patent
Li

(10) Patent No.: US 12,293,030 B2
(45) Date of Patent: May 6, 2025

(54) TOUCHPAD DEVICE

(71) Applicant: Chicony Electronics Co., Ltd., New Taipei (TW)

(72) Inventor: Po-Hsin Li, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 18/602,187

(22) Filed: Mar. 12, 2024

(65) Prior Publication Data

US 2024/0361850 A1    Oct. 31, 2024

(30) Foreign Application Priority Data

Apr. 25, 2023   (TW) .................................. 112115420

(51) Int. Cl.
*G06F 3/0354*    (2013.01)
(52) U.S. Cl.
CPC ................................ *G06F 3/03547* (2013.01)
(58) Field of Classification Search
CPC .................................................. G06F 3/03547
See application file for complete search history.

(56) References Cited

U.S. PATENT DOCUMENTS

| | | | | |
|---|---|---|---|---|
| 2020/0183510 | A1* | 6/2020 | Chen | G06F 3/03547 |
| 2021/0333898 | A1* | 10/2021 | Wang | G06F 3/03547 |
| 2022/0091691 | A1* | 3/2022 | Han | G06F 3/04166 |

FOREIGN PATENT DOCUMENTS

| | | |
|---|---|---|
| CN | 115202492 A | 10/2022 |
| TW | 202244696 A | 11/2022 |

* cited by examiner

*Primary Examiner* — Antonio Xavier
(74) *Attorney, Agent, or Firm* — MUNCY, GEISSLER, OLDS & LOWE P.C.

(57) ABSTRACT

A touchpad device includes a substrate, a touch panel, and a balancing assembly. The substrate is provided with an elastic resilient member. The touch panel is disposed above the substrate and has an inner surface, and the inner surface has a first corner, a second corner, a third corner, and a fourth corner. The balancing assembly is disposed between the touch panel and the substrate and includes a first balancing bar, a second balancing bar, a third balancing bar, and a fourth balancing bar. Two ends of the first balancing bar, two ends of the second balancing bar, two ends of the third balancing bar, and two ends of the fourth balancing bar are respectively adjacent to the elastic resilient member and the first corner, the elastic resilient member and the second corner, the elastic resilient member and the third corner, and the elastic resilient member and the fourth corner.

19 Claims, 7 Drawing Sheets

TOUCHPAD DEVICE

CROSS-REFERENCE TO RELATED APPLICATION

This non-provisional application claims priority under 35 U.S.C. § 119 (a) to patent application No. 112115420 filed in Taiwan, R.O.C. on Apr. 25, 2023, the entire contents of which are hereby incorporated by reference.

BACKGROUND

Technical Field

The disclosure relates to an input device, in particular, to a touchpad device.

Related Art

Touchpads are common input devices widely applied in computers. The touchpad is provided for sensing the movement or pressing of a user's finger(s) to control the cursor to perform an action (e.g., to move, to click, or the like).

SUMMARY

A touchpad known to the inventor has a touch panel and a substrate. The touch panel has a pivot side, and the touch panel is pivotally fixed on the substrate through the pivot side. When a portion of the touch panel away from the pivot side is pressed, the touch panel swings downward with respect to the substrate by taking the pivot side as the swing axis so as to generate corresponding signal(s).

However, when the user operates the touch panel, the user cannot always accurately press the portion of the touch panel away from the pivot side. As a result, when the user presses the pivot side of the touch panel or a region or a corner of the touch panel adjacent to the pivot side, the touch panel cannot be moved downward smoothly to generate corresponding signals. Moreover, the user cannot operate the touch panel conveniently and the operation feeling of the user will be affected.

In view of this, in one embodiment, a touchpad device is provided. The touchpad device comprises a substrate, a touch panel, and a balancing assembly. The substrate has a top surface, the top surface is provided with an elastic resilient member, and the elastic resilient member is on a central region of the top surface. The touch panel is disposed above the top surface, the touch panel has an inner surface facing the substrate, the inner surface has a first corner, a second corner, a third corner, and a fourth corner, the first corner is opposite to the third corner, and the second corner is opposite to the fourth corner. The balancing assembly is disposed between the touch panel and the substrate, the balancing assembly comprises a first balancing bar, a second balancing bar, a third balancing bar, and a fourth balancing bar, two ends of the first balancing bar are respectively adjacent to the elastic resilient member and the first corner, two ends of the second balancing bar are respectively adjacent to the elastic resilient member and the second corner, two ends of the third balancing bar are respectively adjacent to the elastic resilient member and the third corner, and two ends of the fourth balancing bar are respectively adjacent to the elastic resilient member and the fourth corner.

Based on the above, in the touchpad device according to one or some embodiments of the disclosure, the elastic resilient member is on the central region of the top surface of the substrate. Moreover, the two ends of the first balancing bar are respectively adjacent to the elastic resilient member and the first corner, the two ends of the second balancing bar are respectively adjacent to the elastic resilient member and the second corner, the two ends of the third balancing bar are respectively adjacent to the elastic resilient member and the third corner, and the two ends of the fourth balancing bar are respectively adjacent to the elastic resilient member and the fourth corner. Therefore, during the operation of the touchpad device, when any portion of the touch panel (for example, the corner or the edge of the touch panel) is pressed, the pressing force can be directly and quickly transmitted to the elastic resilient member through the balancing assembly, so that the elastic resilient member is moved downward to provide the pressing operation feeling. Moreover, the issues of excessive wobbling, bending, or empty stroke of the touch panel generated upon the corner or the edge of the touch panel is pressed can be prevented.

BRIEF DESCRIPTION OF THE DRAWINGS

The disclosure will become more fully understood from the detailed description given herein below for illustration only, and thus not limitative of the disclosure, wherein.

DETAILED DESCRIPTION

It should be noted that, in the descriptions for the embodiments, the ordinal numbers, e.g., "first", "second", "third", "fourth", "fifth", and "sixth" are used to describe different elements, and these elements are not limited due to the use of these ordinal numbers. Moreover, in all the drawings, the same reference numbers are used to indicate the same or similar elements.

Figure 1:
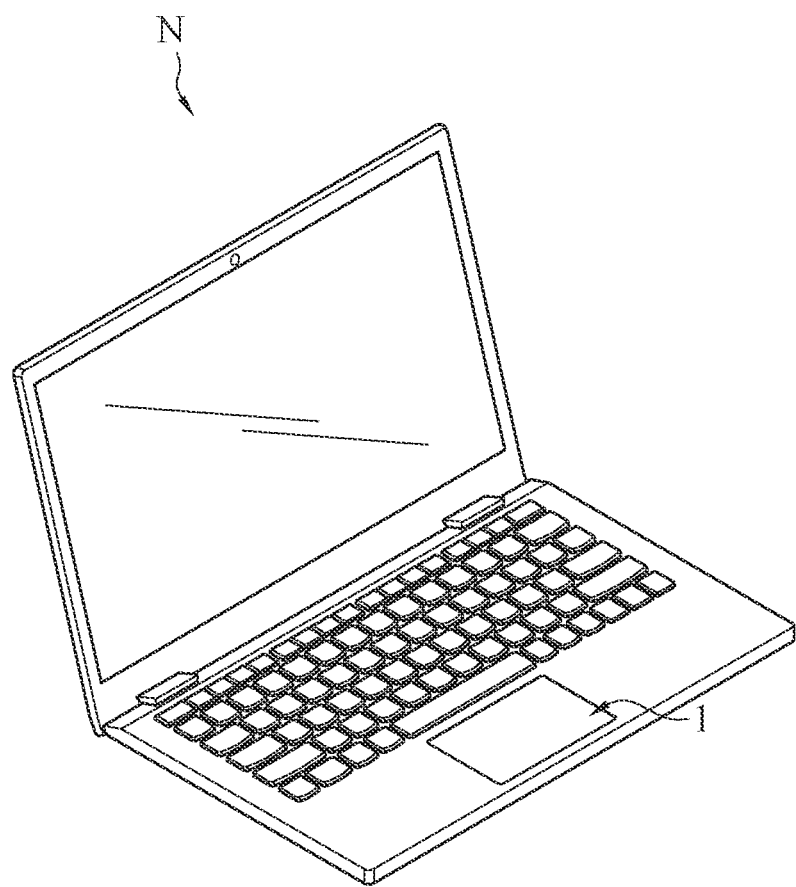
FIG. 1 illustrates a schematic application view of a touchpad device according to an exemplary embodiment of the disclosure.
Figure 2:
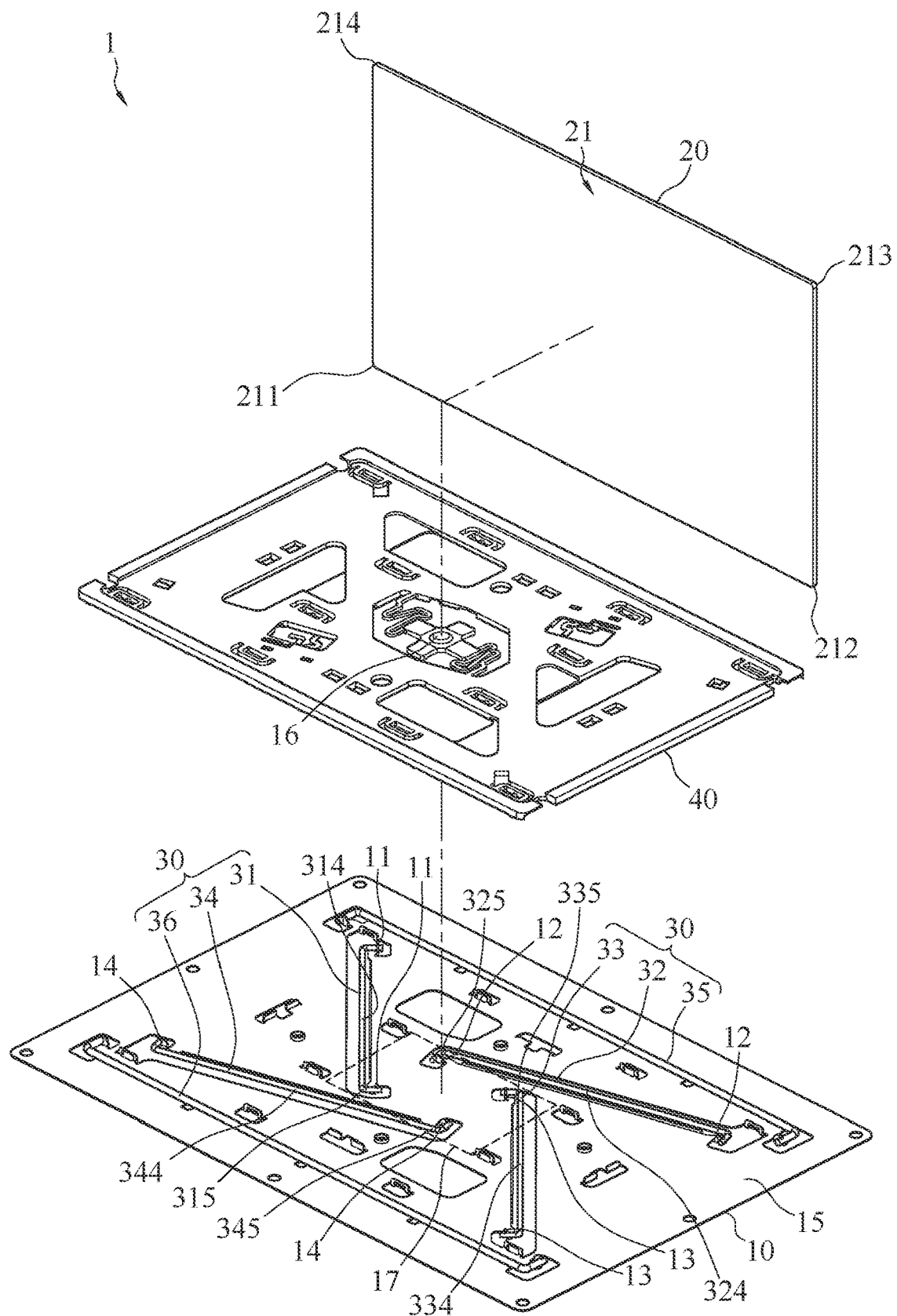
FIG. 2 illustrates an exploded view of the touchpad device according to the exemplary embodiment of the disclosure.
Figure 3:
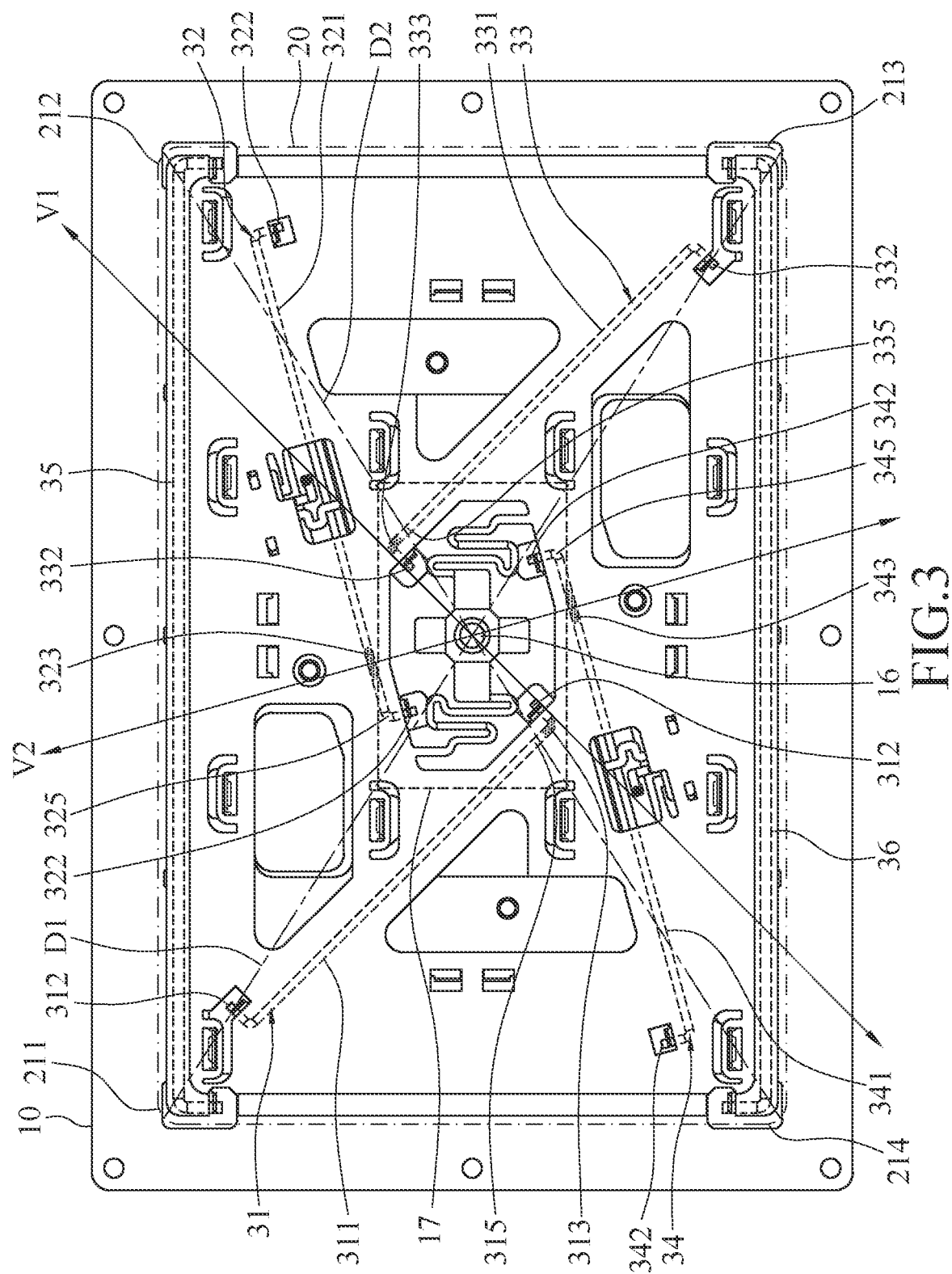
FIG. 3 illustrates a top view of the touchpad device according to the exemplary embodiment of the disclosure.

FIG. 1 illustrates a schematic application view of a touchpad device according to an exemplary embodiment of the disclosure. FIG. 2 illustrates an exploded view of the touchpad device according to the exemplary embodiment of the disclosure. FIG. 3 illustrates a top view of the touchpad device according to the exemplary embodiment of the disclosure. As shown in FIG. 1 and FIG. 2, according to one or some embodiments of the disclosure, the touchpad device 1 may be applied in a computer product, and the user can operate the touchpad device 1 by sliding or pressing the touchpad device 1 with the user's finger(s) so as to control the movement of the cursor or to generate corresponding control signal(s). For example, as shown in FIG. 1, in this embodiment, the touchpad device 1 is applied in a notebook computer N, but the disclosure is not limited thereto. In some embodiments, the touchpad device 1 may be applied in other portable computers (e.g., tablet computers). Alternatively, in some embodiments, the touchpad device 1 may be an individual device and may be capable of externally connected to a portable computer, but the disclosure is not limited thereto.

As shown in FIG. 2 and FIG. 3, in the first embodiment, the touchpad device 1 comprises a substrate 10, a touch panel 20, and a balancing assembly 30. The substrate 10 may be a rigid plate made of metal (e.g., iron, aluminum, alloy, etc.) or plastic material. The substrate 10 is at a bottom of the touchpad device 1 and has a top surface 15, the top surface 15 is provided with an elastic resilient member 16, and the elastic resilient member 16 is on a central region 17 of the top surface 15. In other words, in this embodiment, the elastic resilient member 16 is within the covered range of the central region 17.

As shown in FIG. 2 and FIG. 3, in this embedment, the central region 17 (the region enclosed by dashed lines) is a portion of the top surface 15, a central position of the central region 17 corresponds to a central position of the top surface 15, and a position of the elastic resilient member 16 is at a center of the top surface 15. Moreover, in this embodiment, the substrate 10, the central region 17, and the touch panel 20 are all rectangular shaped. Moreover, a length of a long side of the central region 17 may be in a range between ¼ and ⅓ of a length of a long side of the touch panel 20, and a length of a short side of the central region 17 may be in a range between ¼ and ⅓ of a length of a short side of the touch panel 20, but the disclosure is not limited thereto. In some embodiments, the length of the long side of the central region 17 may be in a range between ¼ and ⅓ of a length of a long side of the substrate 10, and the length of the short side of the central region 17 may be in a range between ¼ and ⅓ of a length of a short side of the substrate 10.

However, it is understood that, the disclosure is not limited thereto. In some embodiments, the shapes of the substrate 10, the central region 17, and the touch panel 20 may be determined according to actual product demands. For example, the shapes of the substrate 10, the central region 17, and the touch panel 20 may be all square, and a side of the central region 17 may be in a range between ¼ and ⅓ of a side of the touch panel 20 or in a range between ¼ and ⅓ of a side of the substrate 10.

In some embodiments, the elastic resilient member 16 may be a rubber dome, a metal dome, a spring, an elastic piece, or other elastic components. The elastic resilient member 16 is capable of storing elastic forces when being pressed.

As shown in FIG. 2, the touch panel 20 is above the top surface 15 and is configured to be touched or pressed by a user. The touch panel 20 has an inner surface 21 facing the substrate 10, and the elastic resilient member 16 can abut against the inner surface 21. For example, in this embodiment, the elastic resilient member 16 abuts against a central portion of the inner surface 21, so that the touch panel 20 is maintained at a height position. Therefore, when the touch panel 20 is pressed and moved downward with respect to the substrate 10, the touch panel 20 correspondingly abuts against the elastic resilient member 16, so that the elastic resilient member 16 stores an elastic force and triggers the touch panel 20 to generate signal(s). When the touch panel 20 is released, the touch panel 20 is moved back to the height position by using the elastic force stored in the elastic resilient member 16.

As shown in FIG. 2, in this embodiment, the inner surface 21 of the touch panel 20 is square-shaped, and the inner surface 21 of the touch panel 20 has a first corner 211, a second corner 212, a third corner 213, and a fourth corner 214. The first corner 211 is opposite to the third corner 213, and the second corner 212 is opposite to the fourth corner 214.

With reference to FIG. 2 and FIG. 3. In FIG. 3, the touch panel 20 is illustrated in a perspective manner (also in FIG. 6 and FIG. 7), so that the arrangement of the balancing assembly 30 shielded by the touch panel 20 can be seen from the figures. In this embodiment, the balancing assembly 30 is disposed between the touch panel 20 and the substrate 10. The balancing assembly 30 comprises a first balancing bar 31, a second balancing bar 32, a third balancing bar 33, and a fourth balancing bar 34. Two ends of the first balancing bar 31 are respectively adjacent to the elastic resilient member 16 and the first corner 211. Two ends of the second balancing bar 32 are respectively adjacent to the elastic resilient member 16 and the second corner 212. Two ends of the third balancing bar 33 are respectively adjacent to the elastic resilient member 16 and the third corner 213. Two ends of the fourth balancing bar 33 are respectively adjacent to the elastic resilient member 16 and the fourth corner 214. In other words, in this embodiment, the first balancing bar 31, the second balancing bar 32, the third balancing bar 33, and the fourth balancing bar 34 are not parallel to the side of the touch panel 20; instead, in this embodiment, the first balancing bar 31, the second balancing bar 32, the third balancing bar 33, and the fourth balancing bar 34 surround the elastic resilient member 16 and are arranged radially with respect to the elastic resilient member 16.

Accordingly, through the arrangement of the balancing assembly 30 in one or some embodiments of the disclosure, when any portion of the touch panel 20 (for example, the corner or the edge of the touch panel 20) is pressed, the pressing force can be directly and quickly transmitted to the elastic resilient member 16 through the balancing assembly 30, so that the elastic resilient member 16 is moved downward to provide the pressing operation feeling. Moreover, the issues of excessive wobbling, bending, or empty stroke of the touch panel 20 generated upon the corner or the edge of the touch panel 20 is pressed can be prevented. For example, as shown in FIG. 2 and FIG. 3, when the first corner 211 of the touch panel 20 is pressed, because the two ends of the first balancing bar 31 are respectively adjacent to the first corner 211 and the elastic resilient member 16, the pressing force can be directly transmitted to the elastic resilient member 16 along an extension direction of the first balancing bar 31 to drive the elastic resilient member 16 to move downward. Likewise, when the second corner 212 or the third corner 213 or the fourth corner 214 of the touch panel 20 is pressed, the pressing force can be directly transmitted to the elastic resilient member 16 through the second balancing bar 32 or the third balancing bar 33 or the fourth balancing bar 34. Accordingly, the transmission performance of the pressing force can be enhanced.

Moreover, for the balancing assembly 30, the four balancing bars (the first balancing bar 31, the second balancing bar 32, the third balancing bar 33, and the fourth balancing bar 34) are respectively between the elastic resilient member 16 and the four corners (the first corner 211, the second corner 212, the third corner 213, and the fourth corner 214) of the touch panel 20. Therefore, the length of each of the balancing bars can be greatly reduced, so that the rigidity of each of the balancing bars can be enhanced, thereby further enhancing the transmission performance of the pressing force.

As shown in FIG. 3, in this embodiment, the inner surface 21 of the touch panel 20 has a first diagonal line D1 and a second diagonal line D2. The first corner 211 is connected to the third corner 213 through the first diagonal line D1, the second corner 212 is connected to the fourth corner 214 through the second diagonal line D2, and an intersection of the first diagonal line D1 and the second diagonal line D2 corresponds to a central position of the elastic resilient member 16.

Furthermore, the first balancing bar 31 has a first end 315 adjacent to the elastic resilient member 16, the third balancing bar 33 has a third end 335 adjacent to the elastic resilient member 16, the first end 315 and the third end 335 are at two opposite sides of the elastic resilient member 16, and the first end 315 and the third end 335 are adjacent to the second diagonal line D2. Therefore, in one or some embodiments of the disclosure, the first end 315 of the first balancing bar 31 and the third end 335 of the third balancing bar 33 can be arranged closer to the central position of the elastic resilient member 16. Therefore, when the first corner 211 or the third corner 213 is pressed, the pressing force can be transmitted to the central position of the elastic resilient member 16, thereby increasing the response speed of the elastic resilient member 16 to move downward upon the elastic resilient member 16 is applied with a pressing force. Therefore, the issues of excessive wobbling, bending, or empty stroke of the touch panel 20 upon the corner or the edge of the touch panel 20 is pressed can be prevented.

Further, as shown in FIG. 3, in this embodiment, the second balancing bar 32 has a second end 325 adjacent to the elastic resilient member 16, the fourth balancing bar 34 has a fourth end 345 adjacent to the elastic resilient member 16, the second end 325 and the fourth end 345 are at two opposite sides of the elastic resilient member 16, and the second end 325 and the fourth end 345 are adjacent to the first diagonal line D1. Therefore, in one or some embodiments of the disclosure, likewise, the second end 325 of the second balancing bar 32 and the fourth end 345 of the fourth balancing bar 34 can be arranged closer to the central position of the elastic resilient member 16. Therefore, when the second corner 212 or the fourth corner 214 is pressed, the pressing force can be transmitted to the central position of the elastic resilient member 16, thereby increasing the response speed of the elastic resilient member 16 to move downward upon the elastic resilient member 16 is applied with a pressing force. Therefore, the issues of excessive wobbling, bending, or empty stroke of the touch panel 20 upon the corner or the edge of the touch panel 20 is pressed can be prevented.

With reference to FIG. 2 and FIG. 3. In this embodiment, the first balancing bar 31 has a first shaft 311 and two first side bars 312, and the two first side bars 312 are respectively connected to two opposite ends of the first shaft 311. The second balancing bar 32 has a second shaft 321 and two second side bars 322, and the two second side bars 322 are respectively connected to two opposite ends of the second shaft 321. The third balancing bar 33 has a third shaft 331 and two third side bars 332, and the two third side bars 332 are respectively connected to two opposite ends of the third shaft 332. The fourth balancing bar 34 has a fourth shaft 341 and two fourth side bars 342, and the two fourth side bars 342 are respectively connected to two opposite ends of the fourth shaft 341.

With reference to FIG. 2 and FIG. 3. The first shaft 311 of the first balancing bar 31, the second shaft 321 of the second balancing bar 32, the third shaft 331 of the third balancing bar 33, and the fourth shaft 341 of the fourth balancing bar 34 are respectively pivotally connected to the lower portion of the touch panel 20. Therefore, when the touch panel 20 is pressed and moved downward, the first shaft 311, the second shaft 321, the third shaft 331, and the fourth shaft 341 can rotate with respect to the touch panel 20. In this embodiment, the inner surface 21 of the touch panel 20 is provided with an assembling plate 40. For example, the assembling plate 40 may be adhesively fixed to the inner surface 21 of the touch panel 20, and the first shaft 311, the second shaft 321, the third shaft 331, and the fourth shaft 341 are pivotally connected to the assembling plate 40, respectively.

With reference to FIG. 2 and FIG. 3. The substrate 10 is provided with two first assembling members 11 spaced apart from each other. One of the two first assembling members 11 is adjacent to the first corner 211 of the touch panel 20, and the other first assembling member 11 is adjacent to the elastic resilient member 16. The two first side bars 312 of the first balancing bar 31 are movably assembled to the two first assembling members 11, respectively. Therefore, when the touch panel 20 is pressed and moved downward, each of the first side bars 312 is movable with respect to a corresponding one of the first assembling members 11.

Figure 4:
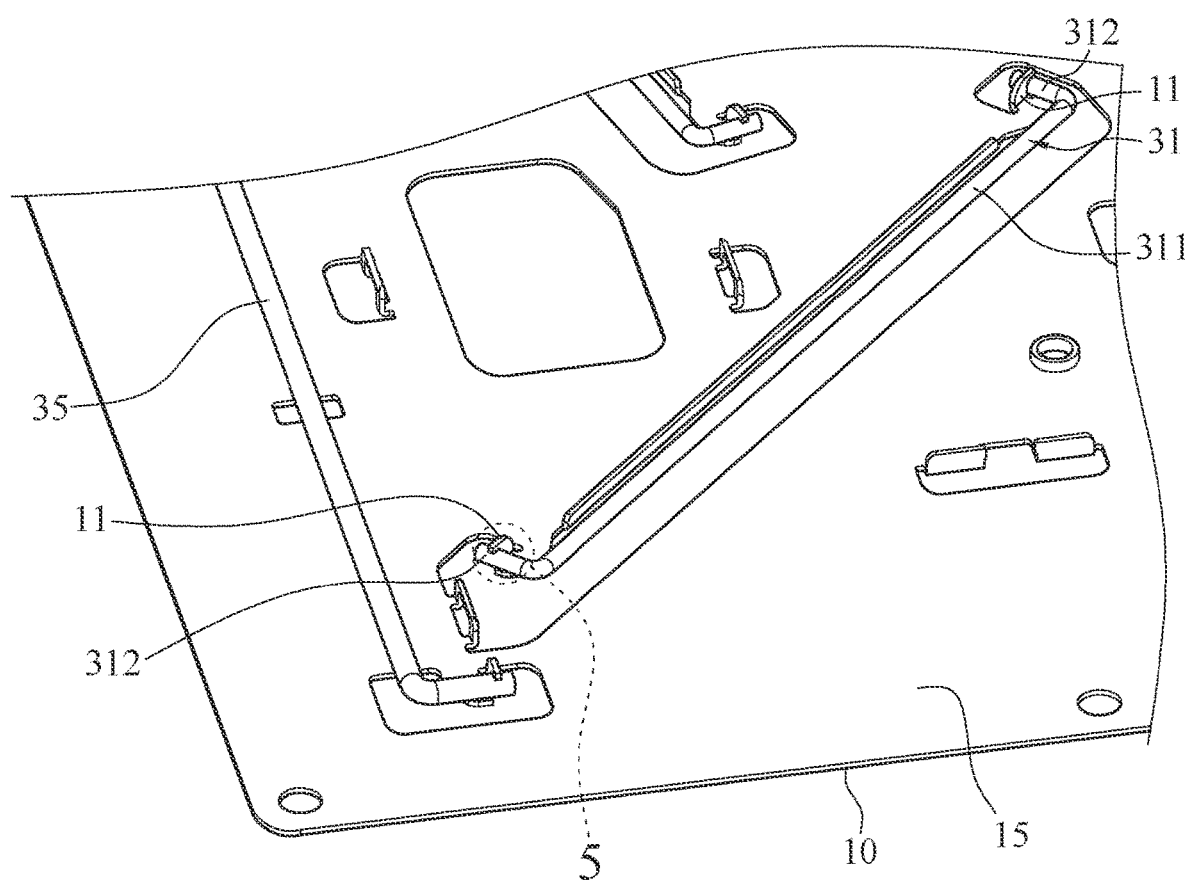
FIG. 4 illustrates a partial perspective view of the touchpad device according to the exemplary embodiment of the disclosure.
Figure 5:
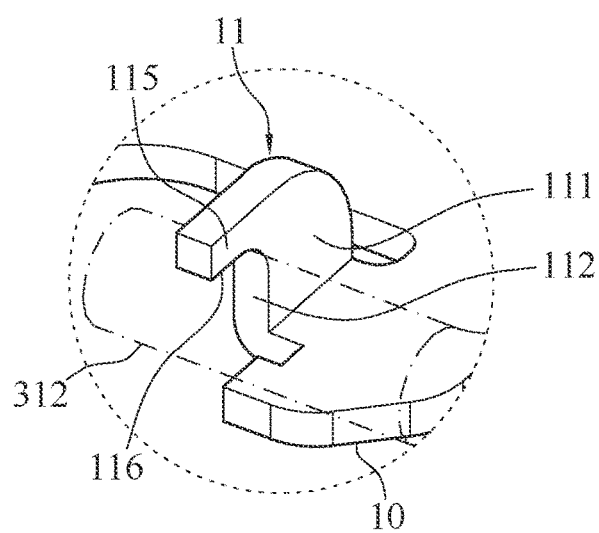
FIG. 5 illustrates an enlarged partial perspective view of FIG. 4.

Furthermore, for example, as shown in FIG. 4 and FIG. 5, where FIG. 5 illustrates an enlarged partial perspective view of the region 5 shown in FIG. 4. In this embodiment, each of the first assembling plates 11 comprises a longitudinal plate 111 and a transversal plate 115, and the longitudinal plate 111 is integrally connected to and perpendicular to the substrate 10. The longitudinal plate 111 has a side portion 112, and the transversal plate 115 extends from the side portion 112, so that each of the first assembling members 11 is formed as an L-shaped structure. Moreover, the transversal plate 115 has a bottom edge 116, and each of the first side bars 312 of the first balancing bar 31 is a cylindrical bar and leans against the bottom edge 116 and the side portion 112. When the touch panel 20 is pressed and moved downward, each of the first side bars 312 can be moved along a direction perpendicular to the transversal plate 115 and swung with respect to the substrate 10. That is, in this embodiment, the contact between the first side bar 312 and the first assembling member 11 is implemented in a multiple point-contact manner rather than line-contact manner or a surface-contact manner. Therefore, the contact area between the first side bar 312 and the first assembling member 11 can be reduced, thereby decreasing the interferences or noises generated during the movement of the first side bar 312.

With reference to FIG. 2 and FIG. 3. The substrate 10 is provided with two second assembling members 12 spaced apart from each other, two third assembling members 13 spaced apart from each other, and two fourth assembling members 14 spaced apart from each other. The two second side bars 322 of the second balancing bar 32 are movably assembled to the two second assembling members 12, respectively. The two third side bars 332 of the third balancing bar 33 are movably assembled to the two third assembling members 13, respectively. The two fourth side bars 342 of the fourth balancing bar 34 are movably assembled to the two fourth assembling members 14, respectively. The arrangement between each of the second side bars 322 and a corresponding one of the second assembling members 12, the arrangement between each of the third side bars 332 and a corresponding one of the third assembling members 13, and the arrangement between each of the fourth side bars 342 and a corresponding one of the fourth assembling members 14 may be the same or similar with the arrangement of each of the first side bars 312 and the corresponding one of the assembling members 11, and repeated descriptions are thus omitted herein.

As shown in FIG. 2 and FIG. 3, in this embodiment, the first end 315 of the first balancing bar 31 adjacent to the elastic resilient member 16, the second end 325 of the second balancing bar 32 adjacent to the elastic resilient member 16, the third end 335 of the third balancing bar 33 adjacent to the elastic resilient member 16, and the fourth end 345 of the fourth balancing bar 34 adjacent to the elastic resilient member 16 are overlapped above the central region 17 of the top surface 15 of the substrate 10. In other words, in this embodiment, the first end 315, the second end 325, the third end 335, and the fourth end 345 are within the covered range of the central region 17 and are overlapped above the central region 17 respectively. Therefore, the first end 315, the second end 325, the third end 335, and the fourth end 345 can be arranged closer to the elastic resilient member 16, thus ensuring that the pressing force applied to the elastic resilient member 16 can be transmitted to the central position of the elastic resilient member 16. However, the foregoing embodiments are provided for illustrative purposes. In some embodiments, only some of the first end 315, the second end 325, the third end 335, and the fourth end 345 overlap the central region 17. For example, only the first end 315 and the third end 335 overlap the central region 17 or only the second end 325 and the fourth end 345 overlap the central region 17.

As shown in FIG. 3, in this embodiment, the first shaft 311 of the first balancing bar 31 is parallel to the third shaft 331 of the third balancing bar 33. Moreover, the first shaft 311 has a first overlapped region 313 (as the dot-filled section shown in FIG. 3), and the third shaft 331 has a third overlapped region 333 (as the dot-filled section shown in FIG. 3). The elastic resilient member 16 has a radial direction V1, and the radial direction V1 is perpendicular to the first shaft 311 and the third shaft 331. The first overlapped region 313 and the elastic resilient member 16 are overlapped with each other along the radial direction V1, and the third overlapped region 333 and the elastic resilient member 16 are overlapped with each other along the radial direction V1. Specifically, in this embodiment, the first overlapped region 313 is the region of the first shaft 311 overlapping the elastic resilient member 16, and the third overlapped region 333 is the region of the third shaft 331 overlapping the elastic resilient member 16. Therefore, through the configuration that a region of the first shaft 311 and a region of the third shaft 331 respectively overlap the elastic resilient member 16, when the first corner 211 or the third corner 213 of the touch panel 20 is pressed, the pressing force can be ensured to be transmitted toward the elastic resilient member 16, so that the loss of the pressing force applied to the touch panel 20 can be reduced, and the response speed of the elastic resilient member 16 to move downward upon the elastic resilient member 16 is applied with a pressing force can be increased. Therefore, the issues of excessive wobbling, bending, or empty stroke of the touch panel 20 upon the corner or the edge of the touch panel 20 is pressed can be prevented.

As shown in FIG. 3, in this embodiment, the second shaft 321 of the second balancing bar 32 is parallel to the fourth shaft 341 of the fourth balancing bar 34. Moreover, the second shaft 321 has a second overlapped region 323 (as the dot-filled section shown in FIG. 3), and the fourth shaft 341 has fourth overlapped region 343 (as the dot-filled section shown in FIG. 3). The elastic resilient member 16 has a radial direction V2, and the radial direction V2 is perpendicular to the second shaft 321 and the fourth shaft 341. The second overlapped region 323 and the elastic resilient member 16 are overlapped with each other along the radial direction V2, and the fourth overlapped region 343 and the elastic resilient member 16 are overlapped with each other along the radial direction V2. Specifically, in this embodiment, the second overlapped region 323 is the region of the second shaft 321 overlapping the elastic resilient member 16, and the fourth overlapped region 343 is the region of the fourth shaft 34 overlapping the elastic resilient member 16. Therefore, through the configuration that a region of the second shaft 321 and a region of the fourth shaft 341 respectively overlap the elastic resilient member 16, when the second corner 221 or the fourth corner 214 of the touch panel 20 is pressed, the pressing force can be ensured to be transmitted toward the elastic resilient member 16, so that the loss of the pressing force applied to the touch panel 20 can be reduced, and the response speed of the elastic resilient member 16 to move downward upon the elastic resilient member 16 is applied with a pressing force can be increased. Therefore, the issues of excessive wobbling, bending, or empty stroke of the touch panel 20 upon the corner or the edge of the touch panel 20 is pressed can be prevented.

Moreover, as shown in FIG. 2, in this embodiment, the first balancing bar 31 has a middle point 314, the second balancing bar 32 has a middle point 324, the third balancing bar 33 has a middle point 334, and the fourth balancing bar 34 has a middle point 344. The first end 315 of the first balancing bar 31 is between the fourth end 345 and the middle point 344 of the fourth balancing bar 34. Other balancing bars may have the same configurations; in other words, in this embodiment, the second end 325 of the second balancing bar 32 is between the first end 315 and the middle point 314 of the first balancing bar 31, the third end 335 of the third balancing bar 33 is between the second end 325 and the middle point 324 of the second balancing bar 32, and the fourth end 345 of the fourth balancing bar 34 is between the third end 335 and the middle point 334 of the third balancing bar 33.

As shown in FIG. 2 and FIG. 3, in this embodiment, the balancing assembly 30 further comprises a fifth balancing bar 35 and a sixth balancing bar 36. The fifth balancing bar 35 and the sixth balancing bar 36 are parallel to each other. Moreover, two ends of the fifth balancing bar 35 are respectively adjacent to the first corner 211 and the second corner 212, and two ends of the sixth balancing bar 36 are respectively adjacent to the third corner 213 and the fourth corner 214. Therefore, when any corner or edge of the touch panel 20 is pressed, through the linkage between the fifth balancing bar 35 and the sixth balancing bar 36, the touch panel 20 can be moved downward and upward more stably. Therefore, the noises and wobbling during the operation of the touchpad device 1 can be effectively prevented, and the operation feeling of the touchpad device 1 can be enhanced.

Figure 6:
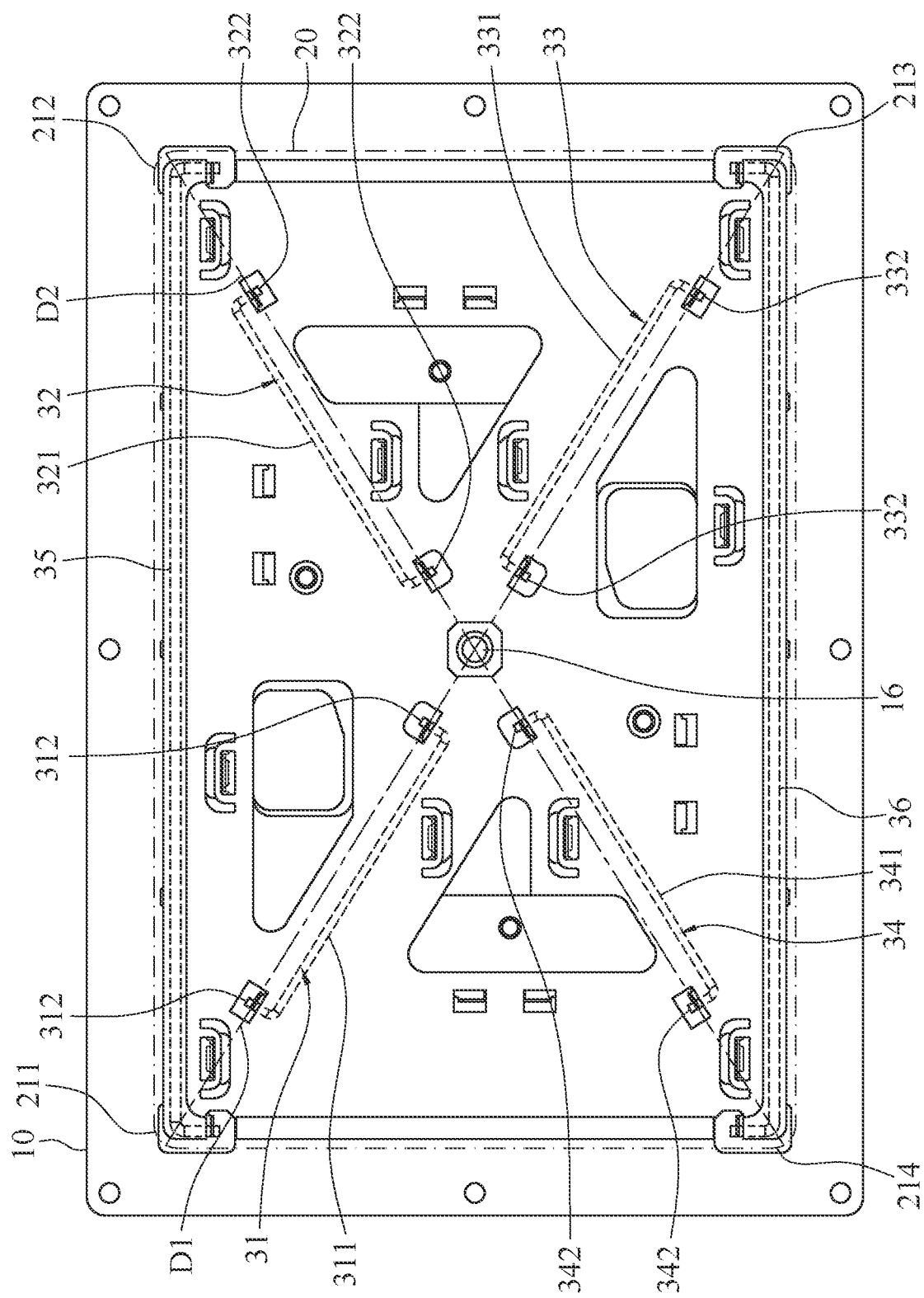
FIG. 6 illustrates a top view of a touchpad device according to another exemplary embodiment of the disclosure.

FIG. 6 illustrates a top view of a touchpad device according to another exemplary embodiment of the disclosure. As shown in FIG. 6, the difference between this embodiment and the embodiment shown in FIG. 3 is at least that the arrangement of the balancing bars. In this embodiment, the first balancing bar 31, the second balancing bar 32, the third balancing bar 33, and the fourth balancing bar 34 of the balancing assembly 30 are arranged radially by taking the elastic resilient member 16 as a center. Moreover, the first shaft 311 of the first balancing bar 31 and the third shaft 331 of the third balancing bar 33 are parallel to the first diagonal line D1, and the second shaft 321 of the second balancing bar 32 and the fourth shaft 341 of the fourth balancing bar 34 are parallel to the second diagonal line D2. Therefore, through the configuration of the balancing assembly 30 of this embodiment, likewise, when any portion of the touch panel 20 (for example, the corner or the edge of the touch panel 20) is pressed, the pressing force can be directly and quickly transmitted to the elastic resilient member 16 through the balancing assembly 30, so that the elastic resilient member 16 is moved downward to provide the pressing operation feeling. Moreover, the issues of excessive wobbling, bending, or empty stroke of the touch panel 20 generated upon the corner or the edge of the touch panel 20 is pressed can be prevented.

Figure 7:
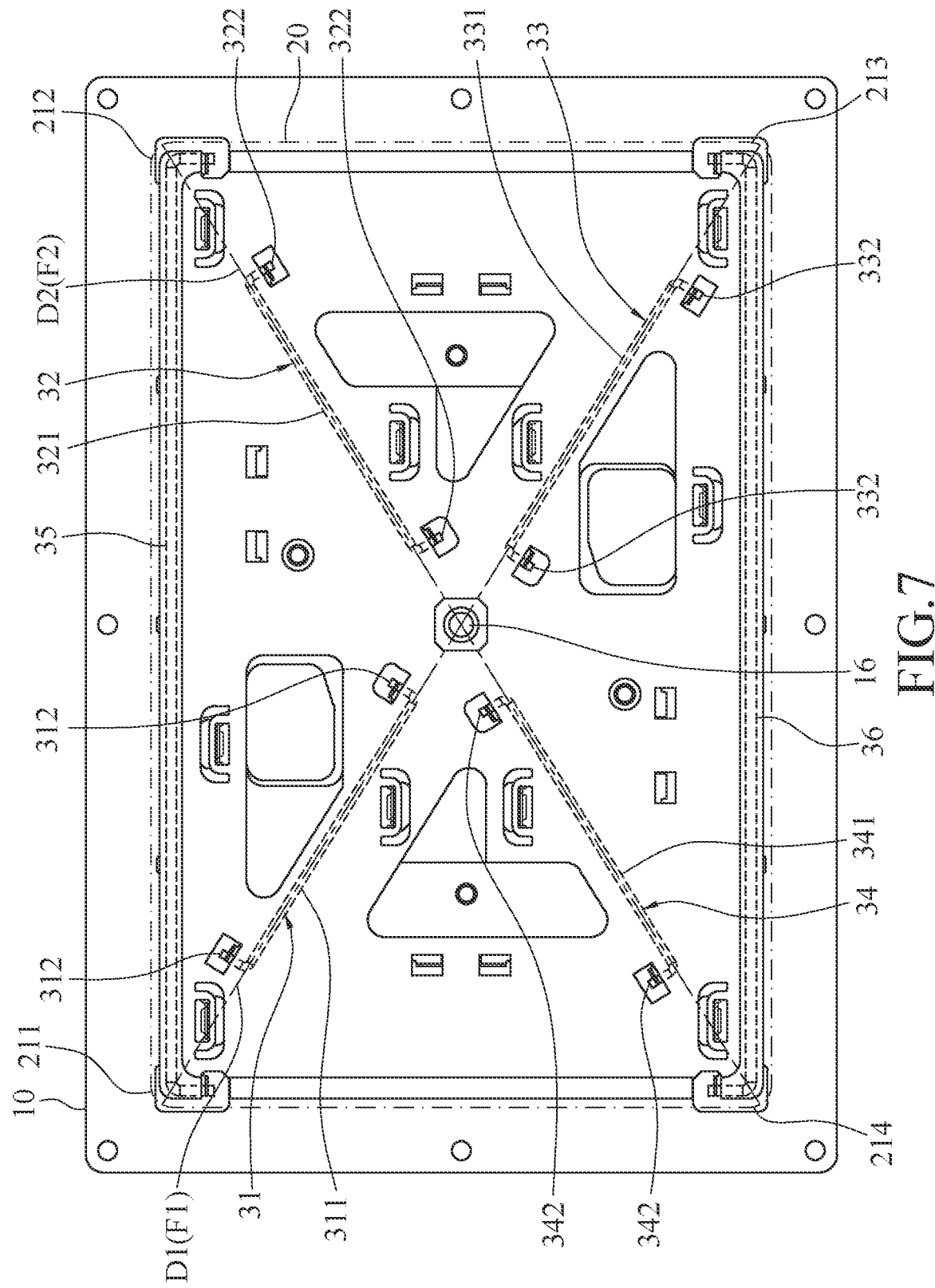
FIG. 7 illustrates a top view of the touchpad device according to another exemplary embodiment of the disclosure.

FIG. 7 illustrates a top view of a touchpad device according to another exemplary embodiment of the disclosure. As shown in FIG. 7, the difference between this embodiment and the embodiment shown in FIG. 6 is at least that the positions of the balancing bars. As compared with the embodiment shown in FIG. 6, in this embodiment, the first shaft 311 of the first balancing bar 31, the third shaft 331 of the third balancing bar 33, the first diagonal line D1, and the central point of the elastic resilient member 16 are all on the same plane F1, and the plane F1 is perpendicular to the touch panel 20. Therefore, when the first corner 211 or the third corner 213 of the touch panel 20 is pressed, the transmission of the pressing force to the elastic resilient member 16 can be performed more effectively. Likewise, the second shaft 321 of the second balancing bar 32, the fourth shaft 341 of the fourth balancing bar 34, the second diagonal line D2, and the central point of the elastic resilient member 16 are all on a same plane F2, and the plane F2 is perpendicular to the touch panel 20. Therefore, when the second corner 212 or the fourth corner 214 of the touch panel 20 is pressed, the transmission of the pressing force to the elastic resilient member 16 can be performed more effectively.

In some embodiments, an angle between each of the first side bars 312 of the first balancing bar 31 and the substrate 10, or between each of the second side bars 322 of the second balancing bar 32 and the substrate 10, or between each of the third side bars 332 of the third balancing bar 33 and the substrate 10, or between each of the fourth side bars 342 of the fourth balancing bar 34 and the substrate 10 may be in a range between 15 degrees and 45 degrees. In the following paragraphs, the configuration between the first balancing bar 31 and the substrate 10 is illustrated as an example with the aids of drawings.

Figure 8:
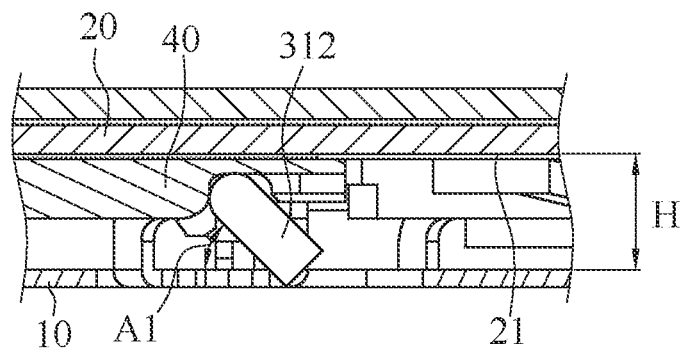
FIG. 8 illustrates a partial cross-sectional view of the touchpad device according to the exemplary embodiment of the disclosure.

As shown in FIG. 2 and FIG. 8, in this embodiment, the elastic resilient member 16 abuts against the inner surface 21 of the touch panel 20, so that the touch panel 20 is at a fixed height H. Moreover, the angle A1 between each of the first side bars 312 of the first balancing bar 31 and the substrate 10 is 45 degrees, so that the length of each of the first side bars 312 can be reduced as much as possible, thereby reducing the loss of the pressing force applied to the touch panel 20. Accordingly, the transmission performance of the pressing force can be enhanced.

Figure 9:
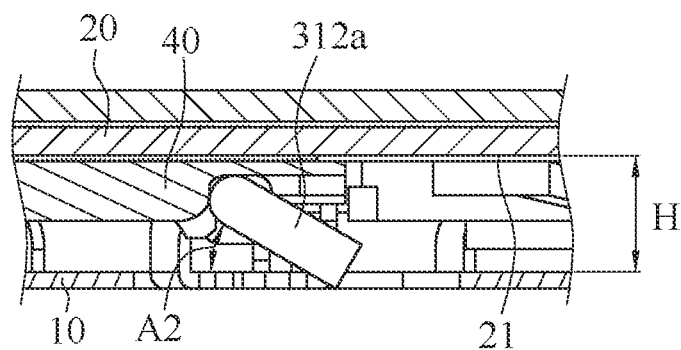
FIG. 9 illustrates a partial cross-sectional view of the touchpad device according to another exemplary embodiment of the disclosure.
Figure 10:
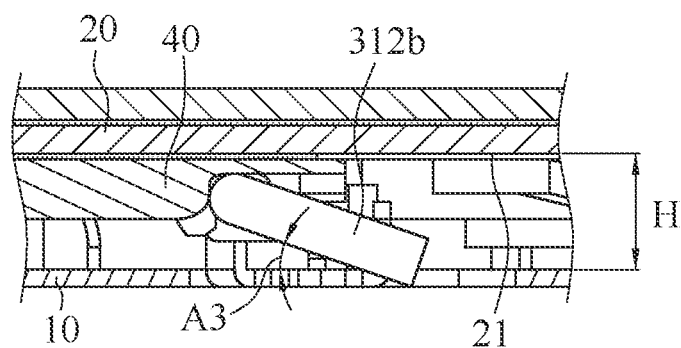
FIG. 10 illustrates a partial cross-sectional view of the touchpad device according to another exemplary embodiment of the disclosure.

However, the foregoing embodiments are provided for illustrative purposes. In some other embodiments, in the case that the touch panel 20 is at the fixed height H, the angle between each of the first side bars 312 of the first balancing bar 31 and the substrate 10 may be other angles. Therefore, the length of each of the first side bars 312 in these embodiments is different from the length of each of the first side bars 312 in the embodiment shown in FIG. 2 and FIG. 8. For example, if the angle between each of the first side bars 312 and the substrate 10 is smaller, the length of each of the first side bars 312 would be longer. As shown in FIG. 9, in this embodiment, the angle A2 between each of the first side bars 312a of the first balancing bar 31 and the substrate 10 is 30 degrees. Therefore, the length of the first side bar 312a is greater than the length of the first side bar 312 of the embodiment shown in FIG. 8. Alternatively, as shown in FIG. 10, in this embodiment, the angle A3 between each of the first side bars 312b of the first balancing bar 31 and the substrate 10 is 18.5 degrees. Therefore, the length of the first side bar 312b is greater than the length of the first side bar 312a of the embodiment shown in FIG. 9.

In some embodiments, when the angle between each of the first side bars 312 and the substrate 10 is in a range between 15 degrees and 45 degrees, the length of each of the first side bars 312 allows a better force transmission performance.

Based on the above, in the touchpad device according to one or some embodiments of the disclosure, the elastic resilient member is on the central region of the top surface of the substrate. Moreover, the two ends of the first balancing bar are respectively adjacent to the elastic resilient member and the first corner, the two ends of the second balancing bar are respectively adjacent to the elastic resilient member and the second corner, the two ends of the third balancing bar are respectively adjacent to the elastic resilient member and the third corner, and the two ends of the fourth balancing bar are respectively adjacent to the elastic resilient member and the fourth corner. Therefore, during the operation of the touchpad device, when any portion of the touch panel (for example, the corner or the edge of the touch panel) is pressed, the pressing force can be directly and quickly transmitted to the elastic resilient member through the balancing assembly, so that the elastic resilient member is moved downward to provide the pressing operation feeling. Moreover, the issues of excessive wobbling, bending, or empty stroke of the touch panel generated upon the corner or the edge of the touch panel is pressed can be prevented.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A touchpad device comprising:
   a substrate having a top surface, wherein the top surface is provided with an elastic resilient member, and the elastic resilient member is on a central region of the top surface;
   a touch panel disposed above the top surface, wherein the touch panel has an inner surface facing the substrate, the inner surface has a first corner, a second corner, a third corner, and a fourth corner, the first corner is opposite to the third corner, and the second corner is opposite to the fourth corner; and
   a balancing assembly disposed between the touch panel and the substrate, wherein the balancing assembly comprises a first balancing bar, a second balancing bar, a third balancing bar, and a fourth balancing bar, two ends of the first balancing bar are respectively adjacent to the elastic resilient member and the first corner, two ends of the second balancing bar are respectively adjacent to the elastic resilient member and the second corner, two ends of the third balancing bar are respectively adjacent to the elastic resilient member and the third corner, and two ends of the fourth balancing bar are respectively adjacent to the elastic resilient member and the fourth corner.

2. The touchpad device according to claim 1, wherein the inner surface of the touch panel has a first diagonal line and a second diagonal line, the first corner is connected to the third corner through the first diagonal line, the second corner is connected to the fourth corner through the second diagonal line, the first balancing bar has a first end adjacent to the elastic resilient member, the third balancing bar has a third end adjacent to the elastic resilient member, the first end and the third end are at two opposite sides of the elastic resilient member, and the first end and the third end are adjacent to the second diagonal line.

3. The touchpad device according to claim 2, wherein the fourth balancing bar has a middle point and a fourth end adjacent to the elastic resilient member, and the first end is between the fourth end and the middle point.

4. The touchpad device according to claim 2, wherein the second balancing bar has a second end adjacent to the elastic resilient member, the fourth balancing bar has a fourth end adjacent to the elastic resilient member, the second end and the fourth end are at the two opposite sides of the elastic resilient member, and the second end and the fourth end are adjacent to the first diagonal line.

5. The touchpad device according to claim 1, wherein the first balancing bar has a first shaft, the third balancing bar has a third shaft, and the first shaft and the third shaft are parallel to each other.

6. The touchpad device according to claim 5, wherein the first shaft has a first overlapped region adjacent to the elastic resilient member, the third shaft has a third overlapped region adjacent to the elastic resilient member, the elastic resilient member has a radial direction, the radial direction is perpendicular to the first shaft and the third shaft, the first overlapped region and the elastic resilient member are overlapped with each other along the radial direction, and the third overlapped region and the elastic resilient member are overlapped with each other along the radial direction.

7. The touchpad device according to claim 1, wherein the second balancing bar has a second shaft, the fourth balancing bar has a fourth shaft, and the second shaft and the fourth shaft are parallel to each other.

8. The touchpad device according to claim 7, wherein the second shaft has a second overlapped region adjacent to the elastic resilient member, the fourth shaft has a fourth overlapped region adjacent to the elastic resilient member, the elastic resilient member has a radial direction, the radial direction is perpendicular to the second shaft and the fourth shaft, the second overlapped region and the elastic resilient member are overlapped with each other along the radial direction, and the fourth overlapped region and the elastic resilient member are overlapped with each other along the radial direction.

9. The touchpad device according to claim 1, wherein the first balancing bar has a first end adjacent to the elastic resilient member, the third balancing bar has a third end adjacent to the elastic resilient member, and the first end and the third end overlap with the central region.

10. The touchpad device according to claim 9, wherein the second balancing bar has a second end adjacent to the elastic resilient member, the fourth balancing bar has a fourth end adjacent to the elastic resilient member, and the second end and the fourth end overlap with the central region.

11. The touchpad device according to claim 1, wherein the first balancing bar, the second balancing bar, the third balancing bar, and the fourth balancing bar are arranged radially by taking the elastic resilient member as a center.

12. The touchpad device according to claim 1, wherein the inner surface of the touch panel is provided with an assembling plate, the first balancing bar has a first shaft, the second balancing bar has a second shaft, the third balancing bar has a third shaft, the fourth balancing bar has a fourth shaft, and the first shaft, the second shaft, the third shaft, and the fourth shaft are pivotally connected to the assembling plate.

13. The touchpad device according to claim 1, wherein the inner surface of the touch panel has a first diagonal line and a second diagonal line, the first corner is connected to the third corner through the first diagonal line, the second corner is connected to the fourth corner through the second diagonal line, the first balancing bar has a first shaft, the second balancing bar has a second shaft, the third balancing bar has a third shaft, the fourth balancing bar has a fourth shaft, the first shaft and the third shaft are parallel to the first diagonal line, and the second shaft and the fourth shaft are parallel to the second diagonal line.

14. The touchpad device according to claim 13, wherein the first shaft and the first diagonal line are at the same plane, and the plane is perpendicular to the touch panel.

15. The touchpad device according to claim 1, wherein the first balancing bar has a first shaft and two first side bars, the two first side bars are respectively connected to two opposite ends of the first shaft, the substrate is provided with two assembling members, and the two first side bars are movably assembled to the two assembling members, respectively.

16. The touchpad device according to claim 15, wherein each of the assembling members comprises a longitudinal plate and a transversal plate, the longitudinal plate is integrally connected to the substrate and has a side portion, the transversal plate integrally extends from the side portion, the transversal plate has a bottom edge, and each of the two first side bars leans against the bottom edge and the side portion.

17. The touchpad device according to claim 15, wherein an angle between each of the two first side bars and the substrate is in a range between 15 degrees and 45 degrees.

18. The touchpad device according to claim 17, wherein the angle between each of the two first side bars and the substrate is 45 degrees.

19. The touchpad device according to claim 1, wherein the balancing assembly comprises a fifth balancing bar and a sixth balancing bar, two ends of the fifth balancing bar are respectively adjacent to the first corner and the second corner, and two ends of the sixth balancing bars are respectively adjacent to the third corner and the fourth corner.

* * * * *